3,175,129
MAGNET CONTROL CIRCUIT
Ivan H. Brown and Reuben H. Gordon, Vallejo, Calif., assignors to Gordon-Brown Company, Vallejo, Calif., a partnership
Filed May 4, 1962, Ser. No. 192,540
2 Claims. (Cl. 317—123)

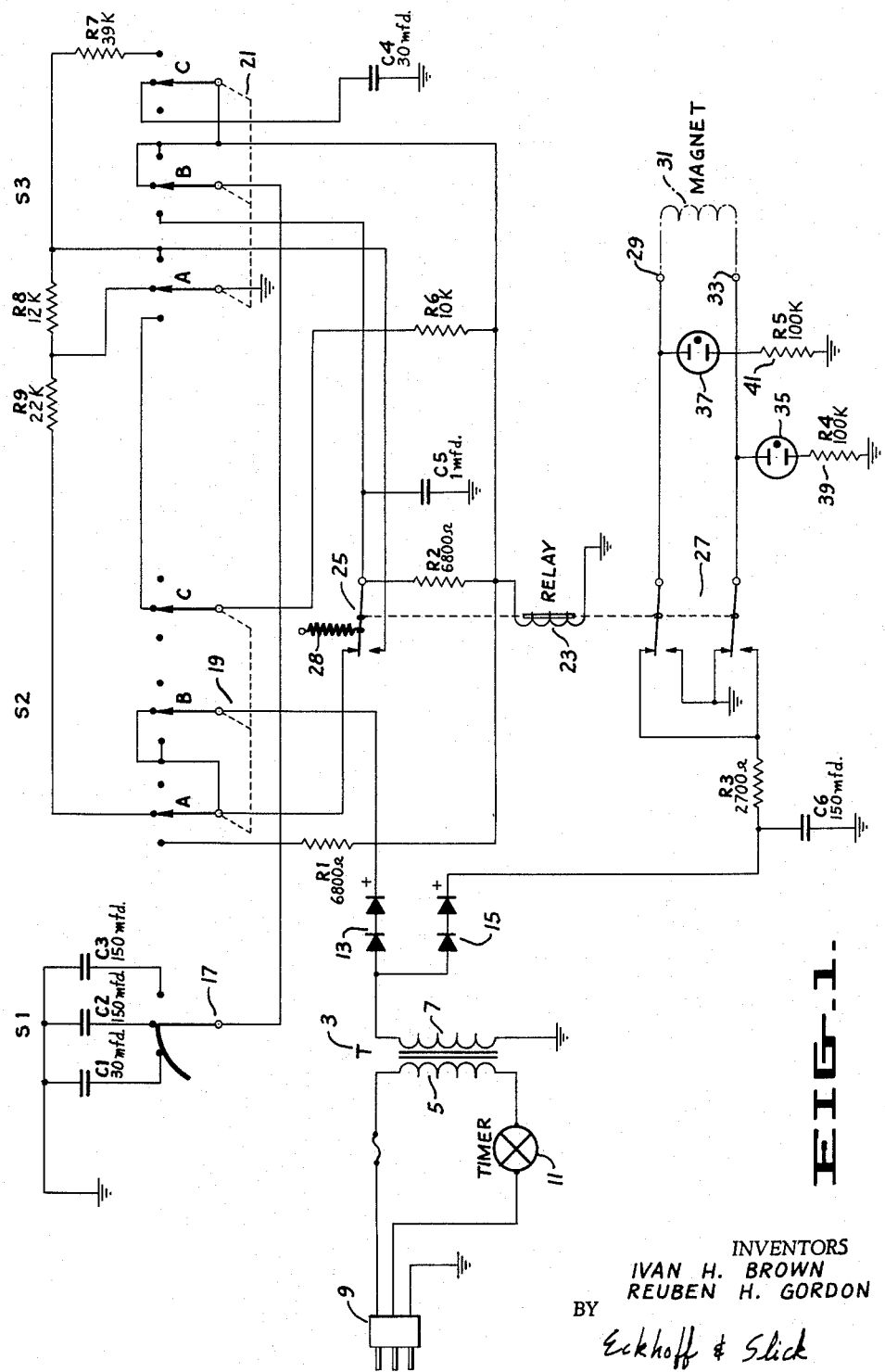

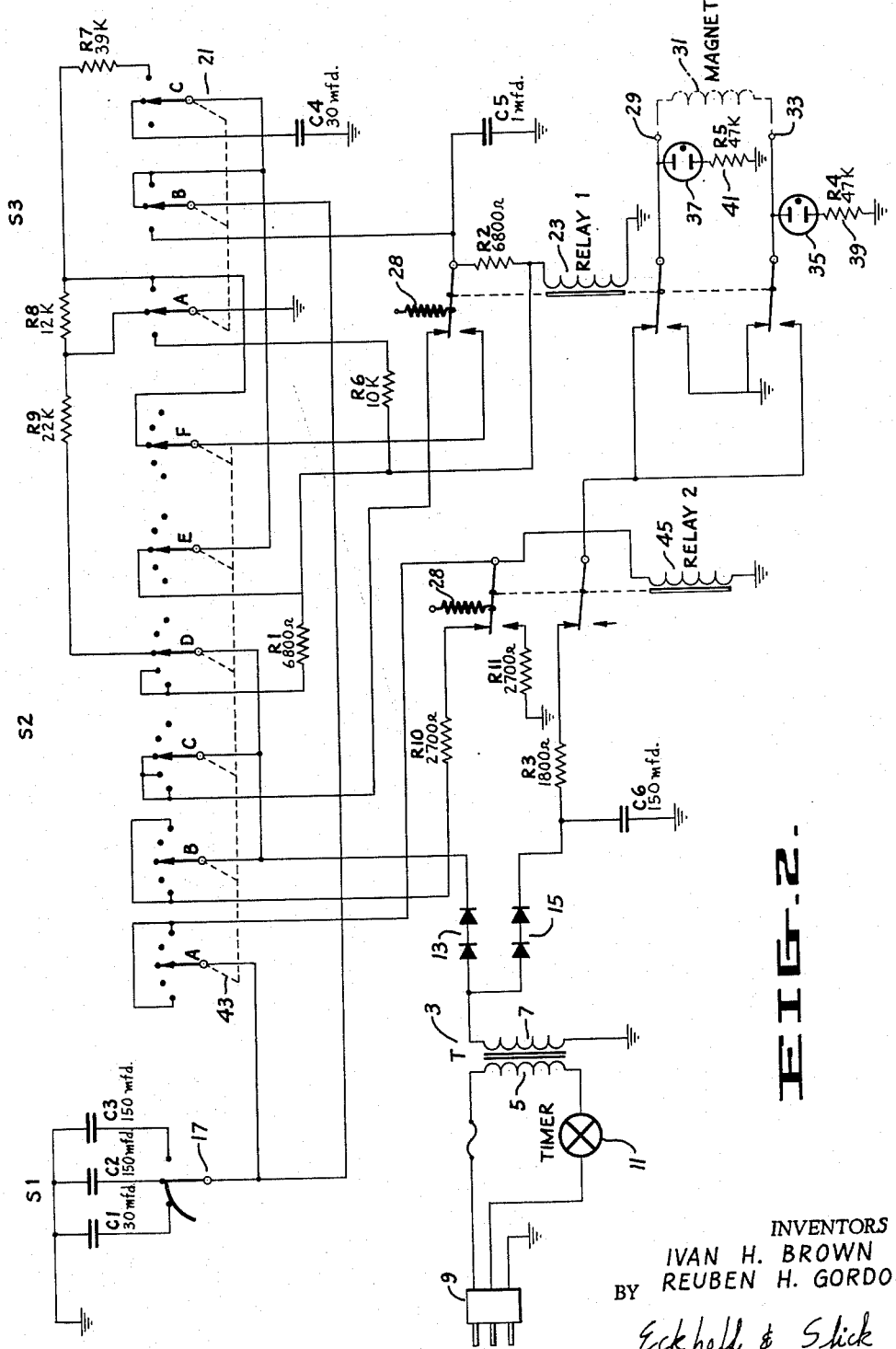

This invention relates to a magnet activating and control circuit and more specifically is an improvement over the circuit shown in our Patent 2,897,411.

For certain purposes, it is desired to provide a control circuit for magnets and the like wherein the polarity of the magnet can be conveniently switched from north to south or vice versa and also wherein the polarity can be alternated at a cyclic rate.

In accordance with the present invention, a novel control circuit is provided wherein the polarity cannot only be switched from north to south at a cyclic rate but also wherein the polarity during the alternation can be predominantly in one direction so that the magnet will be energized for a relatively long period of time on north followed by a relatively short period of time on south or vice versa. In accordance with one embodiment of the present invention, provision is also made for pulsing the magnetic circuit so that one polarity will be turned on and off at a cyclic rate without the opposite polarity being present. Also in accordance with the present invention, a novel interlocking switch system is provided so that if one makes a mistake in the setting of one bank of switches, it will not upset the function of the device as determined by another set of switches.

In the drawings forming part of this application:

FIGURE 1 is a schematic diagram of a circuit embodying the present invention.

FIGURE 2 is a schematic diagram, similar to that of FIGURE 1 except for the provision of a pulsing circuit.

Referring now to the drawings by reference characters, there is shown in FIGURE 1 a power supply transformer 3 having a primary winding 5 and a secondary winding 7. Provision is made by means of the plug 9 for plugging the transformer into an ordinary household source of alternating current. Preferably the circuit also contains a timer 11 so that the device can be automatically set to operate for a predetermined length of time. The secondary of the transformer is connected to a first set of diodes 13 and a second set of diodes 15 so that two independent sources of direct current are provided. Although this is pulsating direct current, it is filtered to substantially pure direct current by the capacitors hereinafter described. The direct current from the rectifier 13 is used for the control circuit to be described while that from the rectifier 15 is used for the actual operation of the magnet. The device is provided with three selector switches namely a single-pole, three-throw shorting switch 17; a ganged, three-pole, three-position switch 19 and a similar ganged, three-pole, three-position switch 21. The function of the switch 19 is to determine whether the magnet is to be alternated between north and south or to remain steady in one direction. When the center contact is closed, the magnet will alternate between north and south while if the contacts are in the right-hand position, the magnet will be permanently on south and if the contacts are on the left-hand position the magnet will be permanently on north. In this and the discussion which follows, it is assumed that if a positive voltage is applied to the upper terminal 29 of the magnet, the polarity will be south and vice versa. Switch 21 is operative only when switch 19 is in its center position and the function of switch 21 is to determine whether the alternating polarity applied to the magnet shall be equal in both directions or whether it shall be predominantly north or predominantly south. Similarly, switch 17 is operative only when switch 19 is in the center position. The function of switch 17 is to determine the length of dwell time when the magnet is to be alternated between north and south and also wherein the magnet dwells for a longer time in one position than the other. This is accomplished by switching one or more of the capacitors C1, C2 or C3 in the circuit.

The circuit is provided with a relay 23 the arm of the relay actuating in a single-pole, double-throw set of contacts 25 and a double-pole, double-throw set of contacts 27. The arm of the relay is normally maintained in the up position by spring 28. It will be apparent that the position of the contacts 27 will determine the polarity of the magnet and if the contacts 27 are in the upper position, as illustrated with coil 23 not energized, a positive voltage will be impressed at the upper terminal 29 of the magnet 31 giving the magnet a south polarity as previously explained, while if the contacts are in the lower position a positive voltage will be impressed at the terminal 33 giving the magnet 31 a north polarity. Preferably two neon indicator lights 35 and 37 with associated resistors 39 and 41 are employed to show whether the magnet is energized and in which polarity.

Turning now to a description of the operation of the circuit, if the switch 19 is placed in the right position the relay 23 will be inactive since power for the control circuit is broken by the center deck B of the switch 19. Thus the spring 28 will hold the contacts of the relay 23 in the upper position so that a steady positive voltage will be supplied to terminal 29. If switch 19 is now turned to the left-hand position, the current will flow through deck B of switch 19 to deck A thence through R1 to the coil 23 of the relay. This will cause the contacts of the relay to go into the downward position causing the switch 27 to reverse, applying a steady negative voltage to terminal 29 and a positive voltage to terminal 33 of the magnet 31. It will be noted that in the two extreme positions of switch 19 the switches 17 and 21 are inoperative.

As has been said before, when the poles of switch 19 are in the center position, a pulsating alternating current is applied to the magnet. When the contacts of the switch 21 are in the center position, these alternations are of equal duration in both directions. Thus, assuming that both switches 19 and 21 are in the center position, as illustrated, and switch 17 is in any one of its three positions, it will be seen that current will be applied through decks B and A of switch 19 to the coil of the relay 23 through the resistance R2. However, since one or more of the capacitors C1, C2 and C3 is now in the circuit of the relay, through the path provided in deck B of switch 21, the relay cannot act until the capacitor of switch 17 has become charged. Naturally, this charging time is determined by the resistance R2. As soon as the capacitor becomes charged, the relay will then act, reversing the polarity through the action of the contacts 27 and at the same time causing the contacts 25 to change positions so that now voltage is removed from the relay coil 23 but the relay is held in its retracted position by the charge on the capacitors of switch 17 which start discharging through R2 and R8. As the capacitors become discharged, the relay will release going back to its former position for a repetition of the cycle. Normally, the resistance R8 through which capacitors discharge will be substantially higher than the resistance R2 through which the capacitors are charged since on discharge the resistance of the relay coil itself will be parallel with R8. The capacitors C1, C2 and C3 are of suitable sizes so that one can set the desired frequency of the alternation by switch 17.

If the switch 19 is left in its center position and switch 21 turned to the right-hand set of contacts, it will be seen that again the relay cannot act until one of the capacitors of switch 17 is charged through R2. However, as soon as the relay acts, the capacitors can almost immediately discharge through R7 and R2 to ground so that the relay stays in its retracted position only a relatively short period of time. Thus, in this position of the switch, there is a relatively long south polarity produced in the magnet alternating with a relatively short duration of the north polarity. If the switch 21 is now changed to the left position the opposite becomes true since now one of the capacitors of switch 17 can start charging without resistance in the circuit by the circuit completed in deck B of switch 21. Thus, the relay will almost immediately close and upon closing, will tend to remain closed since now the capacitors C1, C2 and C3 can only discharge through the relatively high resistance of R2 and R6. Thus, in this position, there will first be a very short south polarity alternating with a relatively long north polarity in the magnet circuit and so on.

In FIGURE 2 a somewhat similar circuit is shown which has all of the functions of the circuit of FIGURE 1 and with the added function of being able to pulse the magnet in either direction. The pulse on and off times are approximately equal and the period of the pulse can be varied at will. Those portions of the two circuits which are common have the same numbers. In the circuit of FIGURE 2 the switch 21 has the same function as the switch 21 of FIGURE 1. The switch 19 of FIGURE 1 has been replaced with a six-pole, five-position switch designated 43. The center position of switch 43 and the positions immediately to the right and left of the center have exactly the same functions as the corresponding positions of the switch 19 of FIGURE 1 and the functions of the switch in these positions will therefore not be described. Two new positions have been added, that at the extreme right and that at the extreme left. When the switch 43 is in the extreme right position, the magnet will be regularly pulsed south and the on and off times will be substantially equal. A similar result is achieved by placing the switch 43 in the extreme left position, but here the magnet is pulsed north. In either position the length of the pulse on and off times is regulated by the capacitors attached to switch 17. However, when the switch 43 is in either position immediately to the right or to the left of the center position, the capacitors attached to switch 17 have exactly the same function as described in connection with FIGURE 1. Thus the capacitors attached to switch 17 have a two-fold purpose in the circuit of FIGURE 2.

It will be seen that a second relay 45 has been added to the circuit of FIGURE 2. The function of this relay is as follows. Assuming that the switch 43 is in the extreme right position, it will be apparent that the relay 23 is not energized so that any current conducted to the magnet will be of the south polarity. As the switch 43 is turned to the right position, a path is completed to the coil of the relay 45 but this path is through the resistor R10 which has one of the capacitors of switch 17 in parallel with its high voltage side so that the relay will not immediately close but will remain in the up position, as shown, until sufficient current has passed through the resistor R10 to charge the capacitor attached to the switch 17. As soon as the capacitor is charged, the relay will act, breaking the current to the magnet through the lower set of relay contacts while the upper set of contacts now disconnects the relay coil from the source of electricity and places the resistance R11 to ground in parallel with the relay coil. However, since it takes some time for the capacitor to discharge through the resistance R11, the relay will remain in the down position for approximately the same length of time as it had previously remained in the up position, and, as the capacitor discharges, will finally release for a repetition of the cycle. Thus, a series of on and off pulses will be produced in the magnet of the south polarity, the duration of both the on and off pulses being determined by which of the capacitors C1, C2 or C3 is switched into the circuit by means of the switch 17. If the switch 43 is placed in the left-hand position, the relay 45 will pulse on and off in exactly the same manner since the opposite poles of the A and B decks of switch 43 are connected together. However, in the extreme left position, the coil of relay 23 is energized through the connection of decks C and D of switch 43 so that the pulsing produced in the relay 45 will now be a north on and off pulse rather than the south on and off pulse described before.

Many variations can be made in the exact circuitry described without departing from the spirit of this invention.

In the drawings, certain exact values of resistance and capacitance have been shown but these are for purposes of illustration and demonstrate an optimum circuitry.

We claim:

1. A magnet control circuit comprising in combination a first source of direct current and a second source of direct current a resistance-capacitance oscillating circuit including a plurality of resistance paths whereby the charge and discharge times of the resistance-capacitance circuit can be varied, a double-pole, double-throw switch actuated by a relay whereby said second source of electricity can be reversed in polarity for supplying a magnet circuit, a first switch connected to said first source of electricity having poles thereon to actuate the coil of said relay whereby in one position the relay will be held permanently open, in a second position will be held permanently closed and in a third position be caused to oscillate by means of said resistance capacitance circuit, means whereby the capacitance of said circuit can be altered to change the frequency of oscillation, and a second switch in said circuit, operative when the first switch is in its third position, said second switch being operatively connected to said resistance-capacitance oscillating circuit to control the charge and discharge times of the capacitance, said second switch having a position wherein the charge and discharge times of the oscillating circuit are of substantially equal duration and having second and third positions controlling said resistance paths whereby a relatively long charge time and a relatively short discharge time are provided and vice versa, second switch having positions thereon whereby when said first switch is in the third position said second switch has a position wherein the alternations are of substantially equal duration in each direction and positions whereby the duration of the current flowing in one direction is greater than that flowing in the opposite direction.

2. The control circuit of claim 1 wherein a second relay is operatively connected to the first-mentioned relay, said second relay being adapted to pulse the first relay in a selected direction, and a resistance-capacitance network operatively connected to said second relay to control the pulsing rate.

References Cited in the file of this patent
UNITED STATES PATENTS 2,786,970    Connoy _____ Mar. 26, 1957
2,897,411    Brown et al. _____ July 28, 1959